UNITED STATES PATENT OFFICE.

WILLIAM H. ADAMS, OF KENYON, RHODE ISLAND.

WATERPROOF FABRIC AND COATING.

1,231,687.

Specification of Letters Patent.

Patented July 3, 1917.

No Drawing.

Application filed November 30, 1915. Serial No. 64,343.

*To all whom it may concern:*

Be it known that I, WILLIAM H. ADAMS, a citizen of the United States, and resident of Kenyon, county of Washington, State of Rhode Island, have invented an Improvement in Waterproof Fabrics and Coatings, of which the following description is a specification.

This invention relates to improvements in waterproof coatings for fibrous materials such as textile fabrics, papers and other substances to render them impervious to water; and the primary object thereof is to provide a coating material, having in combination with certain of the usual coating materials, a filler comprising hydraulic, cementitious, or colloid forming elements which will increase the coherence, adhesiveness and continuity of the applied composition thereby producing a more permanently waterproof fabric or other material which will be superior in quality, consistency and appearance to those now manufactured.

In waterproofing fibrous material such as fabrics, paper, etc., it has been customary to coat or impregnate the material with a solution of rubber in a volatile solvent or a mixture of mineral, vegetable or animal hydrocarbons in the form of pitches, waxes, oils, with or without, but usually with, the use of a volatile solvent to facilitate the impregnation of the fibrous materials. In many instances an inert filler of plain or pigmented non-soluble powdered or naturally finely divided material is added to the mixture for the purpose of filling the orifices in the fibrous material to insure a complete impervious coating, but this filler has had merely the mechanical function of closing the pores or apertures in the fibrous material without entering into the chemical composition of the waterproofing material.

Some of the usual mineral, vegetable and animal hydrocarbons which have thus been used are; viscous materials such as asphalts, pitches, still residues, various coal and wood tar products; waxes, such as ozocerite or paraffin, ceresin, beeswax, carnauba wax, yellow wax, etc.; resins and gums, such as gutta percha, caoutchouc, halite, chicle, copal gum, etc.; various oils and fats, including vaseline, vulcanized or blown oils, cottonseed oil, linseed oil, castor oil, animal fats and their derivatives, and various volatile solvents, such as naphtha, benzin, gasolene, etc.

The waterproofing composition has heretofore usually been made by mixing one or more of the viscous or resinous materials, or both, with a suitable wax and oil, dissolved in or softened by a sufficient amount of volatile solvent to enable the mixture to coat smoothly or impregnate thoroughly the surface of the material being treated, the inert filling material being maintained in suspension in the solution by stirring the mixture or by ebullition or in any other convenient manner until the waterproofing material is applied to the fabric or other material to be coated.

I have discovered that if, in such a mixture, instead of an inert filler, a finely divided filler is employed which is insoluble in the volatile solvent employed but which is of a cementitious or hydraulic nature capable of forming permanent colloid or crystalline modifications in the presence of water, either self contained in the mixture or hygroscopic, carbonic acid, or other chemicals, (including certain acids or alkalis) the resulting waterproofing mixture possesses more permanent, more adhesive, more flexible and better waterproofing qualities and that the waterproof material is superior in quality, consistency and appearance to that which has been produced heretofore.

I have found that a large number of cementitious, preferably hydraulic materials may thus be used in a powdered state as a filler for waterproofing compositions among which may be mentioned Portland cement, gypsum, plaster of Paris, quick lime, hydraulic lime, hydrated lime, puzzolana, magnesium cement, iron cement, slag cement, Rosendale cement, Roman cement, dry alkaline silicates and others which are susceptible to the action of water, carbonic acid, etc.

In use a suitable amount of one or more of these cementitious or hydraulic fillers may be incorporated in a finely divided condition with the other ingredients of a suitable waterproofing mixture of the character aforesaid in any usual manner as by grinding with other ingredients or by sifting and stirring or kneading the powdered filler into the mixture.

The cementitious or hydraulic filler thus incorporated in the mixture and applied to the fabric or other fibrous material appears slowly to combine hygroscopically with the moisture of the atmosphere or with small percentages of water mechanically contained in or chemically liberated by, the other ingredients of the mixture, and in some instances combines with carbonic acid from the atmosphere or from the other ingredients so that a hydrated or carbonated modification of the filler is disseminated throughout the waterproofing composition. This form of filler swells as it absorbs the material or carbonic acid and thus expanding acts to fill the voids in the coating composition and the interstices in the fabric, and in its final state assists in producing a colloid solid or semi-solid emulsion or mixture with the other ingredients which not only fills the interstices, voids, pores or other apertures but increases the impermeability, coherence, continuity and adhesiveness of the coating.

I have observed that in some mixtures made in accordance with my invention, there appears to be, and probably is, more or less actual chemical union between the cementitious or hydraulic filler and the other ingredients.

One of the most satisfactory waterproofing compositions which may be referred to as an illustrative and preferred embodiment of the principles of my invention comprises the following ingredients in approximately the following proportions;

| | |
|---|---|
| Asphalt | 700 pounds |
| Portland cement | 300 " |
| Carnauba wax | 210 " |
| Ceresin (refined) | 195 " |
| Aluminum oleate | 180 " |
| Castor oil | 100 " |
| Gasolene | 100 to 150 gallons. |

In use these ingredients are intimately mixed with each other and with the solvent as aforesaid. The resultant mixture is then strained and brushed, sprayed or otherwise spread upon the fabric or other material to be waterproofed; or the fabric may be dipped in the mixture and the excess of coating material removed by brushes, scrapers, squeezing rolls or in any other well known manner. The solvent is then allowed or caused to evaporate. The fabric may then be finished by calendering in the usual manner.

The resulting product presents a smooth, homogeneous coating which is free from pores, thoroughly waterproof, is firmly attached to or impregnated in the fabric and is flexible strong and free from scaling, cracking or other usual defects.

It is to be understood that the formula above given is merely illustrative of my invention and not restrictive and that other mixtures of the ingredients herein mentioned or other materials having like characteristics may be employed; and that the relative proportions of the various ingredients, and particularly of the hydraulic or cementitious filler, may be varied to suit the conditions of use within the principles of my invention and within the scope of the following claims.

It is also to be understood that the term "fabric" is used in the following claims in a broad sense to include not only woven or knitted textile material but felts, papers and like products to which a waterproof coating is applied.

Having thus described my invention what I claim as new and desire to secure by Letters Patent is:

1. A thinly fluid waterproofing composition consisting of an adhesive mixture or emulsion of viscous and oleaginous materials and wax softened by a volatile solvent containing a filler of finely divided cementitious material insoluble in said volatile solvent but capable of forming colloid substances by the slow action of self contained or hygroscopic moisture and thereby adapted to increase the impermeable and coherent properties of the composition when applied to the article to be waterproofed.

2. A waterproofing composition for fabrics comprising a thinly fluid adhesive mixture containing viscous hydrocarbon, wax, and oil dissolved in or softened by a volatile solvent combined with a filler of finely divided cementitious material insoluble in said solvent but capable of forming a colloid substance by the action of self contained hygroscopic moisture or by carbonation and thereby adapted to increase the impermeable and coherent properties of the composition when applied to the article to be waterproofed.

3. A waterproofing composition comprising an adhesive mixture containing viscous hydrocarbon, wax and oil dissolved in or softened by a volatile solvent combined with a filler of finely divided hydraulic cement.

4. A waterproofing composition comprising an adhesive mixture containing viscous hydrocarbon, wax, and oil dissolved in or softened by a volatile solvent combined with a filler of finely divided "Portland cement."

5. A waterproofing composition comprising a mixture of asphalt, carnauba wax, ceresin, aluminum oleate and castor oil dissolved in or softened by a volatile solvent combined with a filler comprising finely divided "Portland cement."

6. A waterproof fabric comprising a base of fibrous material coated with a mixture of coherent water repellent materials combined with a filler comprising a colloid substance formed by the slow action of atmospheric moisture on a cementitious or hydraulic material.

7. A waterproof fabric comprising a base of fibrous material coated with a mixture of coherent water repellent materials combined with a filler comprising a colloid substance formed by hydration or carbonation of finely divided "Portland cement."

8. A waterproof fabric comprising a base of fibrous material coated with a composition comprising a mixture of asphalt, carnauba wax, ceresin, aluminum oleate and castor oil and hydrated "Portland cement."

In testimony whereof, I have signed my name to this specification.

WILLIAM H. ADAMS.